US012334644B2

(12) United States Patent
Wang

(10) Patent No.: US 12,334,644 B2
(45) Date of Patent: Jun. 17, 2025

(54) ANTENNA APPARATUS AND ELECTRONIC DEVICE

(71) Applicant: GUANGDONG OPPO MOBILE TELECOMMUNICATIONS CORP., LTD., Guangdong (CN)

(72) Inventor: Zedong Wang, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 247 days.

(21) Appl. No.: 18/341,101

(22) Filed: Jun. 26, 2023

(65) Prior Publication Data

US 2023/0335922 A1 Oct. 19, 2023

Related U.S. Application Data

(63) Continuation of application No. PCT/CN2021/127066, filed on Oct. 28, 2021.

(30) Foreign Application Priority Data

Dec. 28, 2020 (CN) ......................... 202011580857.7

(51) Int. Cl.
*H01Q 25/00* (2006.01)
*H01Q 1/48* (2006.01)

(52) U.S. Cl.
CPC ............... *H01Q 25/00* (2013.01); *H01Q 1/48* (2013.01)

(58) Field of Classification Search
CPC ................................. H01Q 25/00; H01Q 1/48
See application file for complete search history.

(56) References Cited

U.S. PATENT DOCUMENTS

2013/0088404 A1 4/2013 Ramachandran et al.
2017/0048363 A1 2/2017 Lee et al.

FOREIGN PATENT DOCUMENTS

CN 107317095 11/2017
CN 108321495 7/2018
CN 108346863 7/2018
CN 208522084 2/2019
CN 109921172 6/2019

(Continued)

OTHER PUBLICATIONS

WIPO, International Search Report and Written Opinion for PCT/CN2021/127066, Jan. 19, 2022.

(Continued)

*Primary Examiner* — Henry Luong
(74) *Attorney, Agent, or Firm* — Hodgson Russ LLP

(57) ABSTRACT

Provided are an antenna apparatus and an electronic device. A first coupling gap is formed between one end of a second radiator and a first radiator, and the other end of the second radiator is provided with a first ground terminal. One end of a third radiator is connected to the first ground terminal, and the other end thereof extends in a direction away from the second radiator. The third radiator is provided with a second ground terminal spaced apart from the first ground terminal. At least part of the first radiator and the second radiator jointly generate a first resonance. A part of the third radiator located on a side of the second ground terminal away from the first ground terminal generates a second resonance.

20 Claims, 7 Drawing Sheets

(56) References Cited

FOREIGN PATENT DOCUMENTS

| | | | | |
|---|---|---|---|---|
| CN | 110247160 | | 9/2019 | |
| CN | 108631041 B | * | 4/2020 | ............... H01Q 1/22 |
| CN | 111129768 | | 5/2020 | |
| CN | 111244616 | | 6/2020 | |
| CN | 112086753 | | 12/2020 | |
| WO | 2019144927 | | 8/2019 | |
| WO | 2020010923 | | 1/2020 | |
| WO | 2020173294 | | 9/2020 | |

OTHER PUBLICATIONS

CNIPA, First Office Action for CN Application No. 202011580857.7, Apr. 6, 2022.

CNIPA, Notification to Grant Patent Right for Invention for CN Application No. 202011580857.7, May 26, 2022.

EPO, Extended European Search Report for EP Application No. 21913404.6, May 31, 2024.

* cited by examiner

ANTENNA APPARATUS AND ELECTRONIC DEVICE

CROSS-REFERENCE OF RELATED APPLICATIONS

This application is a continuation of International Application PCT/CN2021/127066, filed Oct. 28, 2021, which claims priority to Chinese Patent Application No. 202011580857.7, filed Dec. 28, 2020, the entire disclosures of which are incorporated herein by reference.

TECHNICAL FIELD

The present disclosure relates to the field of communications technologies, and particularly to an antenna apparatus and an electronic device.

BACKGROUND

With the development of communication technology, electronic devices such as smart phones can implement more and more functions, and communication modes of the electronic devices are more diversified.

SUMMARY

In a first aspect, the embodiments of the present disclosure provide an antenna apparatus, and the antenna apparatus includes:

a first radiator;

a second radiator, where a first coupling gap is provided between one end of the second radiator and the first radiator, and a first ground terminal is provided at the other end of the second radiator;

a first feeding source coupled to the first radiator, where the first feeding source is configured to provide a first excitation signal; the first excitation signal is coupled to the second radiator through the first coupling gap, and is grounded through the first ground terminal, to excite at least part of the first radiator and the second radiator to jointly generate a first resonance;

a third radiator, where one end of the third radiator is connected to the first ground terminal, and the other end of the third radiator extends in a direction away from the second radiator; and the third radiator is provided with a second ground terminal spaced apart from the first ground terminal; and a second feeding source, where the second feeding source is coupled to the third radiator on a side of the second ground terminal away from the first ground terminal, and is configured to provide a second excitation signal to excite a part of the third radiator located on the side of the second ground terminal away from the first ground terminal, to generate a second resonance.

In a second aspect, the embodiments of the present disclosure further provide an antenna apparatus, and the antenna apparatus includes:

a first radiator, configured to receive a first excitation signal;

a second radiator, where a first coupling gap is provided between the second radiator and the first radiator, and a first ground terminal is provided at an end of the second radiator away from the first coupling gap; the first excitation signal is coupled to the second radiator through the first coupling gap, and is grounded through the first ground terminal, to excite at least part of the first radiator and the second radiator to jointly generate a first resonance; and a third radiator, where the third radiator is connected to the second radiator at the first ground terminal, and the third radiator is provided with a second ground terminal spaced apart from the first ground terminal; the third radiator is configured to receive a second excitation signal on a side of the second ground terminal away from the first ground terminal, to excite a part of the third radiator to generate a second resonance.

In a third aspect, the embodiments of the present disclosure further provide an electronic device including an antenna apparatus. The antenna apparatus includes:

a first radiator;

a second radiator, where a first coupling gap is provided between one end of the second radiator and the first radiator, and a first ground terminal is provided at the other end of the second radiator;

a first feeding source coupled to the first radiator, where the first feeding source is configured to provide a first excitation signal; the first excitation signal is coupled to the second radiator through the first coupling gap, and is grounded through the first ground terminal, to excite at least part of the first radiator and the second radiator to jointly generate a first resonance;

a third radiator, where one end of the third radiator is connected to the first ground terminal, and the other end of the third radiator extends in a direction away from the second radiator; and the third radiator is provided with a second ground terminal spaced apart from the first ground terminal; and a second feeding source, where the second feeding source is coupled to the third radiator on a side of the second ground terminal away from the first ground terminal, and is configured to provide a second excitation signal to excite a part of the third radiator located on the side of the second ground terminal away from the first ground terminal, to generate a second resonance.

Other features and aspects of the disclosed features will become apparent from the following detailed description, taken in conjunction with the accompanying drawings, which illustrate, by way of example, the features in accordance with embodiments of the disclosure. The summary is not intended to limit the scope of any embodiments described herein.

BRIEF DESCRIPTION OF THE DRAWINGS

In order to clearly explain technical solutions of embodiments of the present disclosure, drawings used in the embodiments will be briefly described below. Apparently, the drawings as described below are merely some embodiments of the present disclosure. Based on these drawings, other drawings can be obtained by those skilled in the art without inventive effort.

DETAILED DESCRIPTION OF PREFERRED EMBODIMENTS

The technical solutions in the embodiments of the present disclosure will be clearly and comprehensively described below with reference to FIG. 1 to FIG. 13 in the embodiments of the present disclosure. Apparently, the described embodiments are only some of the embodiments of the present disclosure, but not all of the embodiments. Based on the embodiments in the present disclosure, all other embodiments, obtained by those skilled in the art without inventive work, fall within the protection scope of the present disclosure.

Reference herein to "an embodiment" means that a particular feature, structure, or characteristic described in conjunction with the embodiment may be included in at least one embodiment of the present disclosure. The appearance of such phrase in various places in the specification does not necessarily mean that all of them refer to a same embodiment, nor that it is a separate or alternative embodiment in mutual exclusive with other embodiments. It is explicitly and implicitly understood by those skilled in the art that the embodiments described herein may be combined with other embodiments.

An antenna apparatus and an electronic device are provided according to the embodiments of the present disclosure. The antenna apparatus is configured to implement a wireless communication function of the electronic device. For example, the antenna apparatus may transmit a Wireless Fidelity (Wireless Fidelity, Wi-Fi) signal, a Global Positioning System (Global Positioning System, GPS) signal, a 3rd-Generation (3rd-Generation, 3G) signal, a 4th-Generation (4th-Generation, 4G) signal, a 5th-Generation (5th-Generation, 5G) signal, or a Near Field communication (Near Field communication, NFC) signal.

Figure 1:
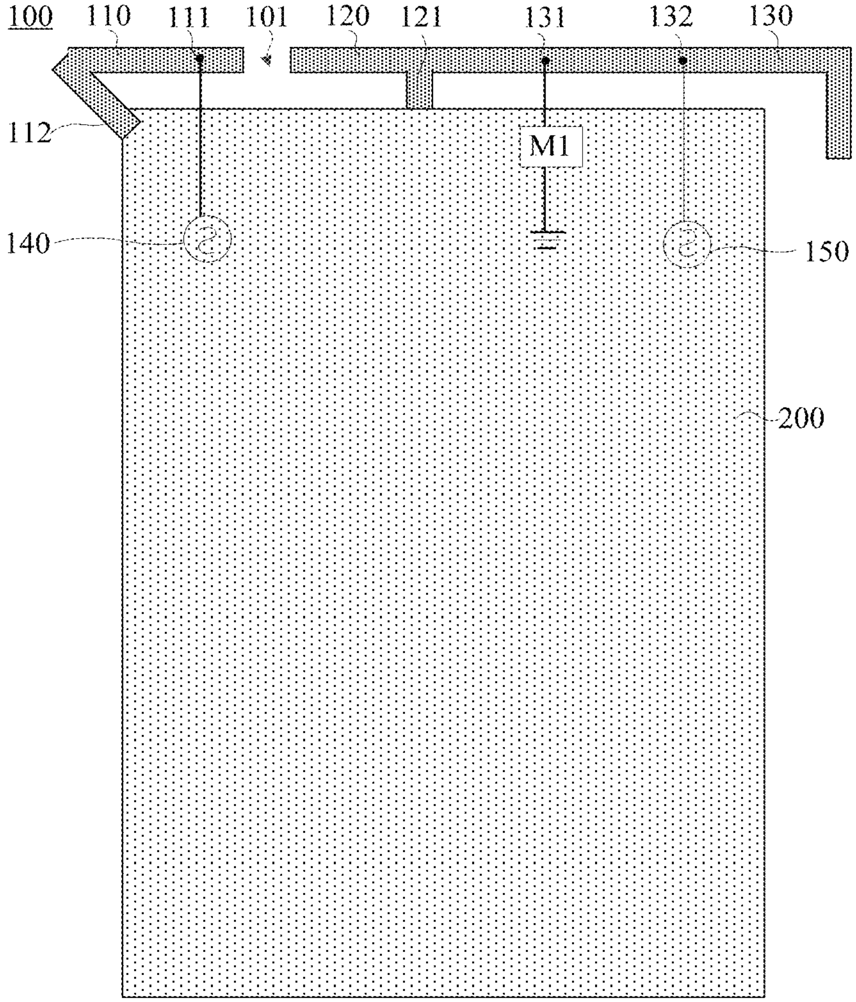
FIG. 1 is a schematic diagram illustrating a first structure of an antenna apparatus according to an embodiment of the present disclosure.
Figure 2:
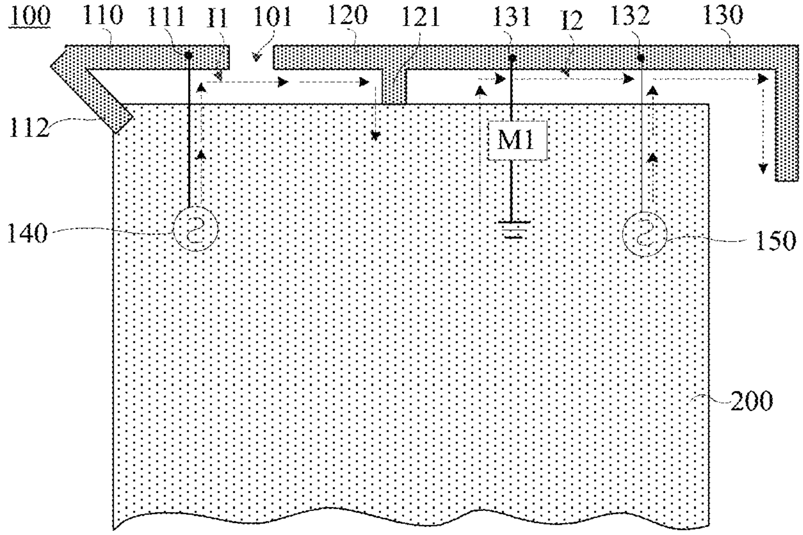
FIG. 2 is a schematic diagram illustrating a current distribution excited by the antenna apparatus shown in FIG. 1.

Referring to FIG. 1 and FIG. 2, FIG. 1 is a schematic diagram illustrating a first structure of an antenna apparatus according to an embodiment of the present disclosure, and FIG. 2 is a schematic diagram illustrating a current distribution excited by the antenna device shown in FIG. 1. The antenna apparatus 100 includes a first radiator 110, a second radiator 120, a third radiator 130, a first feeding source 140 and a second feeding source 150.

The first radiator 110 and the second radiator 120 may be spaced apart from each other. A first coupling gap 101 may be provided between one end of the second radiator 120 and the first radiator 110, and a first ground terminal 121 may be provided at the other end of the second radiator 120. A free end of the first radiator 110 is close to the first coupling gap 101, and a free end of the second radiator 120 is also close to the first coupling gap 101, so that the free end of the first radiator 110 and the free end of the second radiator 120 are oppositely arranged at the first coupling gap 101. The first radiator 110 may be grounded at one end thereof away from the first coupling gap 101, and the second radiator 120 may also be grounded at one end thereof away from the first coupling gap 101, so that the first radiator 110 and the second radiator 120 may form an antenna with a parasitic branch.

It can be understood that a first feeding terminal 111 may be provided on the first radiator 110. The first feeding terminal 111 may be located on a side of the first coupling gap 101 away from the first ground terminal 121. The first radiator 110 may be electrically connected to the first feeding source 140 through the first feeding terminal 111.

The first feeding source 140 may be coupled to the first radiator 110. As shown in FIG. 2, the first feeding source 140 may provide a first excitation signal I1 and feed it into the first radiator 110. The first excitation signal I1 is transmitted in the first radiator 110, and may be coupled into the second radiator 120 through the first coupling gap 101. The first excitation signal I1 may be grounded through the first ground terminal 121 of the second radiator 120. The first excitation signal I1 may excite at least a part of the first radiator 110 and the second radiator 120 to jointly generate a first resonance.

The third radiator 130 may be located on a side of the second radiator 120 away from the first radiator 110, and the third radiator 130 may be connected to the second radiator 120. For example, one end of the third radiator 130 may be connected to the first ground terminal 121, and the other end of the third radiator 130 may extend in a direction away from the second radiator 120. The third radiator 130 and the second radiator 120 may be one-piece formed, and the first ground terminal 121 may increase isolation between the third radiator 130 and the second radiator 120.

It can be understood that, a second ground terminal 131 may be provided at a side of the first ground terminal 121 away from the second radiator 120. The second ground terminal 131 may be spaced apart from the first ground terminal 121. When the second ground terminal 131 is electrically connected to a ground plane 200 of an electronic device 10, an excitation current may be grounded through the second ground terminal 131, where the second ground terminal 131 may prevent the excitation current from flowing into the first ground terminal 121.

It can be understood that a second feeding terminal 132 may also be provided on the third radiator 130, and the second feeding terminal 132 may be located on a side of the second ground terminal 131 away from the first ground terminal 121.

The second feeding source 150 may be coupled to the third radiator 130 on a side of the second ground terminal 131 away from the first ground terminal 121. For example, the second feeding source 150 may be electrically connected to the third radiator 130 through the second feeding terminal 132. As shown in FIG. 2, the second feeding source 150 may provide a second excitation signal 12, and feed the second excitation signal 12 into a part of the third radiator 130 located on a side of the second ground terminal 131 away from the first ground terminal 121. The second excitation signal 12 is transmitted in the part of the third radiator 130, to excite the part of the third radiator 130 located on the side of the second ground terminal 131 away from the first ground terminal 121 to generate a second resonance.

It can be understood that, when the second feeding source 150 provides the second excitation signal 12, a part of the second excitation signal 12 may be grounded through the second ground terminal 131, without flowing into the first ground terminal 121 and the second radiator 120. This avoids the second excitation signal 12 from interfering with the first resonance, and isolation between the first resonance and the second resonance can be further increased.

It can be understood that, a length of the third radiator 130 may be longer than a length of the first radiator 110 or a length of the second radiator 120, so that the third radiator 130 may form a long-branched antenna radiator. In this case, the current for the first resonance is mainly distributed on the second radiator 120, and the current for the second resonance is mainly distributed at one side of the third radiator 130 away from the second radiator 120. As such, there is a long distance between the main distribution area of the current for the first resonance and the main distribution area of the current for the second resonance, and the isolation between the first resonance and the second resonance is relatively good.

In the antenna apparatus 100 of the embodiment of the present disclosure, the first coupling gap 101 is provided between the second radiator 120 and the first radiator 110, and the first ground terminal 121 is provided at one end of the second radiator 120 away from the first coupling gap 101. The third radiator 130 is connected to the first ground terminal 121. The second radiator 120 is located between the first radiator 110 and the third radiator 130. The second ground terminal 131 is provided on the third radiator 130, and the second ground terminal 131 is spaced apart from the first ground terminal 121. The first feeding source 140 is coupled to the first radiator 110. The first excitation signal I1 provided by the first feeding source 140 may be coupled to the second radiator 120 through the first coupling gap 101, to excite at least part of the first radiator 110 and the second radiator 120 to jointly generate the first resonance. The second feeding source 150 is coupled to the third radiator 130 on a side of the second ground terminal 131 away from the first ground terminal 121. The second feeding source 150 may provide the second excitation signal 12, to excite a part of the third radiator 130 located on a side of the second ground terminal 131 away from the first ground terminal 121 to generate the second resonance. In the antenna apparatus 100 of the embodiment of the present disclosure, the structure of the plurality of radiators is compact, and the space occupied by the radiators is small, which enables miniaturization of the antenna apparatus 100. Moreover, the second excitation signal 12 may excite the part of the third radiator 130, located on a side of the second ground terminal 131 away from the first ground terminal 121, to generate the second resonance, and the second ground terminal 131 may prevent flowing of the second excitation signal 12 from the third radiator 130 into the first ground terminal 121 which would otherwise affect the first resonance. Thus, good isolation is enabled between the first resonance and the second resonance, and the first resonance and the second resonance each can have better radiation performance.

Due to the good isolation between the first resonance and the second resonance based on the embodiment of present disclosure, the resonant frequency range of the first resonance may be the same as the resonant frequency range of the second resonance. And even if the antenna apparatus 100 transmits two radio signals at the same frequency band, the isolation may enable the communication requirement to be met. The first resonance and the second resonance may provide multiple-in multiple-out (multiple-in multiple-out, MIMO) transmission.

Certainly, the resonant frequency range of the first resonance may be different from the resonant frequency range of the second resonance. The mutual coupling between the first resonance and the second resonance at different resonance frequencies is weak, and the isolation between the first resonance and the second resonance is better.

It can be understood that, the second ground terminal 131 may be directly electrically connected to the ground plane 200 for grounding. Of course, the second ground terminal 131 may also be electrically connected to the ground plane 200 through other electronic elements or electronic components. Referring to FIG. 1 and FIG. 2, the antenna apparatus 100 may further include a first matching circuit M1. One end of the first matching circuit M1 is coupled to the third radiator 130 through the second ground terminal 131, and the other end of the first matching circuit M1 is grounded.

It can be understood that, when the second feeding source 150 feeds the second excitation signal 12 to the third radiator 130, in order to avoid a small part of current from flowing to the second radiator 120, the first matching circuit M1 may short out a part of the second excitation signal 12, for generation of the second resonance as mentioned above.

It can be understood that, with regard to the expression that the first matching circuit M1 may short out the second excitation signal 12, it may mean that the impedance of the first matching circuit M1 is infinitely small at the frequency band of the second excitation signal 12, so that the second excitation signal 12 is grounded. As shown in FIG. 2, when the second feeding source 150 feeds the second excitation signal 12 to the third radiator 130, a part of the second excitation signal 12 may be grounded through the first matching circuit M1.

It can be understood that, for implementing the shorting out of the second excitation signal 12 by the first matching circuit M1, the first matching circuit M1 may at least include one circuit branch having an impedance of zero ohm. When the second feeding source 150 feeds the second excitation signal 12 to the third radiator 130, the first matching circuit M1 may make the current branch of zero ohm electrically connected to the third radiator 130, and a small part of the second excitation signal 12 may be grounded through the circuit branch of zero ohm.

It can be understood that, in addition to the above circuit branch of zero ohm, the first matching circuit M1 may further include other circuit branches formed by any combination of an inductor, a capacitor and a resistor, which will not be described in detail herein.

It can be understood that, when the first resonance and the second resonance transmit wireless signals at different frequency bands, or one of the first resonance and the second resonance is disabled, or the first resonance and the second resonance are in other low-interference states, the first matching circuit M1 may not turn on the circuit branch of zero ohm. In this case, the effective electrical length of the third radiator 130 may be an extended length from the first ground terminal 121 to the end of the third radiator 130 away from the first ground terminal 121. The first matching circuit M1 may perform impedance matching on the wireless signal transmitted by the third radiator 130 in this case.

In the antenna apparatus 100 of the embodiment of the present disclosure, the first matching circuit M1 is coupled between the second ground terminal 131 and the ground plane 200. The first matching circuit M1 may short out the second excitation signal 12, to avoid the influence of the second excitation signal 12 on the first excitation signal I1, and increase the isolation between the first resonance and the second resonance. Moreover, when the third radiator 130 transmits a wireless signal at another frequency band, the first matching circuit M1 may not turn on the circuit branch of zero ohm, and the first matching circuit M1 may tune this radio signal to ensure radiation performance of the third radiator 130.

Figure 3:
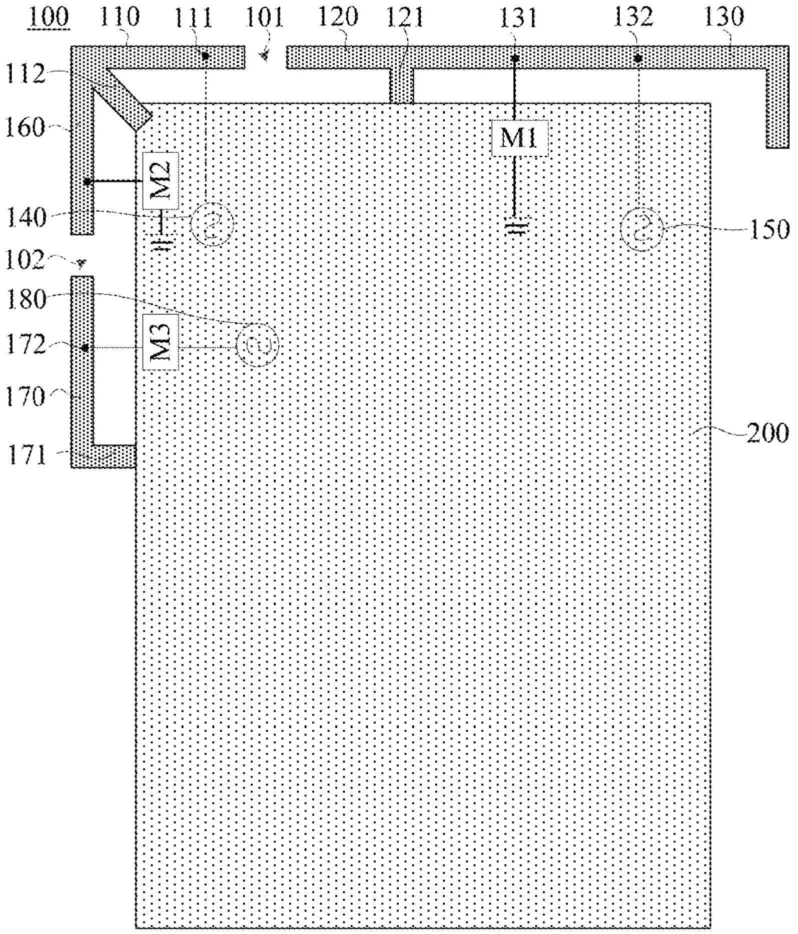
FIG. 3 is a schematic diagram illustrating a second structure of an antenna apparatus according to an embodiment of the present disclosure.
Figure 4:
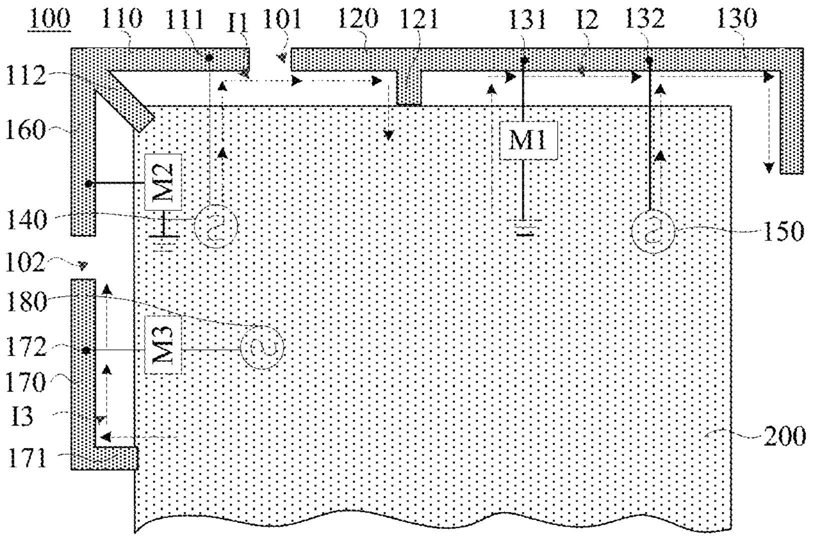
FIG. 4 is a first schematic diagram illustrating a current distribution excited by the antenna apparatus shown in FIG. 3.
Figure 5:
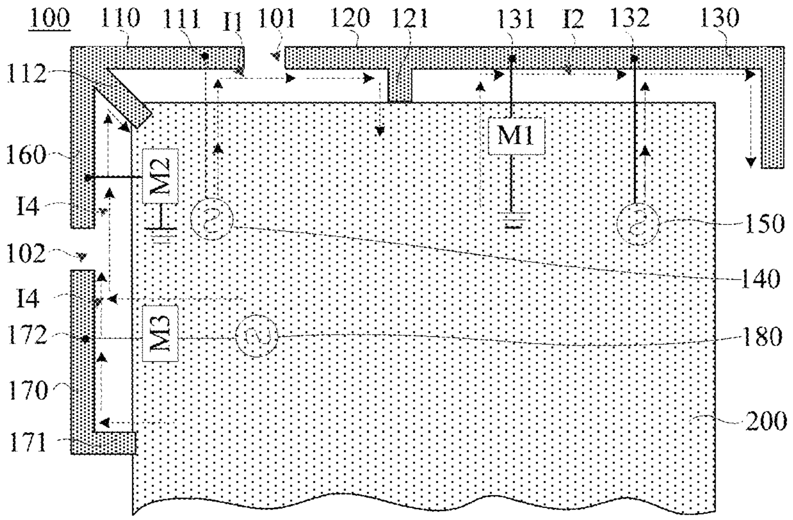
FIG. 5 is a second schematic diagram illustrating the current distribution excited by the antenna apparatus shown in FIG. 3.

Referring to FIG. 3 to FIG. 5, FIG. 3 is a schematic diagram illustrating a second structure of an antenna apparatus according to an embodiment of the present disclosure, FIG. 4 is a first schematic diagram illustrating a current distribution excited by the antenna apparatus shown in FIG. 3, and FIG. 5 is a second schematic diagram illustrating the current distribution excited by the antenna apparatus shown in FIG. 3. The antenna apparatus 100 may further include a fourth radiator 160, a fifth radiator 170, a third feeding source 180, a second matching circuit M2, and a third matching circuit M3. It may be understood that the matching circuit may also be referred to as a matching network, a tuning circuit, a tuning network, etc.

The fourth radiator 160 may be connected to the first radiator 110. For example, in addition to the first feeding terminal 111, the first radiator 110 may be provided with a third ground terminal 112 at one end of the first radiator 110 away from the second radiator 120. One end of the fourth radiator 160 may be connected to the third ground terminal 112, and the other end of the fourth radiator 160 may extend in a direction away from the third ground terminal 112, so that the first radiator 110 and the fourth radiator 160 are connected into a whole.

It can be understood that the third ground terminal 112 may be located at one end of the first radiator 110 away from the first coupling gap 101, and the first feeding terminal 111 may be located between the third ground terminal 112 and the first coupling gap 101. The fourth radiator 160 may be located on a side of the first radiator 110 away from the second radiator 120, that is, the first radiator 110 may be located between the fourth radiator 160 and the second radiator 120. The fourth radiator 160 may share the third ground terminal 112 with the first radiator 110, and the third ground terminal 112 may increase the isolation between the fourth radiator 160 and the first radiator 110.

One end of the second matching circuit M2 may be coupled to the fourth radiator 160, and the other end of the second matching circuit M2 may be grounded. The second matching circuit M2 may perform impedance matching on an excitation signal flowing through the fourth radiator 160.

The fifth radiator 170 may be spaced apart from the fourth radiator 160. A second coupling gap 102 may be provided between one end of the fifth radiator 170 and the fourth radiator 160, and the other end of the fifth radiator 170 may extend in a direction away from the fourth radiator 160. The free end of the fourth radiator 160 is close to the second coupling gap 102, the free end of the fifth radiator 170 is also close to the second coupling gap 102, and the free end of the fourth radiator 160 and the free end of the fifth radiator 170 are oppositely arranged at the second coupling gap 102. A fourth ground terminal 171 may be provided at one end of the fifth radiator 170 away from the second coupling gap 102. The fifth radiator 170 may be grounded when the fourth ground terminal 171 is electrically connected with the ground plane 200 of the antenna apparatus 100 or the electronic device 10. In this way, the fourth radiator 160 and the fifth radiator 170 may also form an antenna with a parasitic branch.

It may be understood that the fifth radiator 170 may be located on a side of the fourth radiator 160 away from the first radiator 110, that is, the fourth radiator 160 may be located between the fifth radiator 170 and the first radiator 110. In this case, the fifth radiator 170, the second coupling gap 102, the fourth radiator 160, the first radiator 110, the first coupling gap 101, the second radiator 120, and the third radiator 130 may be arranged in sequence.

It can be understood that a third feeding terminal 172 may further be provided on the fifth radiator 170. The third feeding terminal 172 may be located between the fourth ground terminal 171 and the second coupling gap 102. The third feeding source 180 may be coupled to the fifth radiator 170, for example, the third feeding source 180 may be electrically connected to the fifth radiator 170 through the third feeding terminal 172 of the fifth radiator 170.

The third matching circuit M3 may be coupled between the third feeding source 180 and the fifth radiator 170. The third matching circuit M3 may perform impedance matching on an excitation signal provided by the third feeding source 180.

It should be understood that the second matching circuit M2 and the third matching circuit M3 each may include a circuit composed of any series connection or any parallel connection of a capacitor, an inductor, and a resistor, which will not be described in detail herein.

The antenna apparatus 100 in the embodiment of the present disclosure may operate in a standalone (Standalone, SA) mode. As shown in FIG. 4, in the standalone mode, the third feeding source 180 may provide a third excitation signal I3, the third excitation signal I3 may be fed, after being tuned by the third matching circuit M3, into the fifth radiator 170 from the third feeding terminal 172, and it may flow on the fifth radiator 170 and be grounded from the fourth ground terminal 171 located at the end away from the second coupling gap 102; as such, the fifth radiator 170 may generate a third resonance under the tuning of the third matching circuit M3.

It can be understood that the third resonance is generated by the fifth radiator 170; in this case, the third resonance and the first resonance may be separated by a length of the fourth radiator 160 and a length of the first radiator 110, and the third resonance and the second resonance may be separated by the length of the fourth radiator 160, the length of the first radiator 110, and the length of a part of the third radiator 130, thus there is not only good isolation between the third resonance and the first resonance, but also good isolation between the third resonance and the second resonance.

It can be understood that, when there is good isolation among the third resonance, the first resonance, and the second resonance, the resonant frequency range of the first resonance, the resonant frequency range of the second resonance, and the resonant frequency range of the third resonance may be the same. And even if the antenna apparatus 100 transmits three wireless signals of the same frequency band, such isolation may also enable the communication requirement to be met. The first resonance, the second resonance, and the third resonance may provide multiple-input multiple-output (MIMO) transmission.

Certainly, one or two of the resonant frequency range of the first resonance, the resonant frequency range of the second resonance, and the resonant frequency range of the third resonance may be different from the other two or the other one of the three resonant frequency ranges, or the resonant frequency range of the first resonance, the resonant frequency range of the second resonance and the resonant frequency range of the third resonance may be different from each other. The mutual coupling among the first resonance, the second resonance, and the third resonance at different resonance frequencies is weak, and the isolation among the first resonance, the second resonance, and the third resonance is better.

The antenna apparatus 100 in the embodiment of the present disclosure may further operate in a non-standalone (Non-standalone, NSA) mode. As shown in FIG. 5, in the NSA mode, the third feeding source 180 may further provide a fourth excitation signal 14. The fourth excitation signal 14 is fed, after being tuned by the third matching circuit M3, into the fifth radiator 170 through the third feeding terminal 172, and the fifth radiator 170 may generate a fourth resonance under the tuning of the third matching circuit M3. Meanwhile, the fourth radiator 160 may generate a third resonance under tuning of the second matching circuit M2.

It can be understood that, the third resonance generated by the fourth radiator 160 may be grounded through the third ground terminal 112, the first resonance may be grounded through the first ground terminal 121, and the third ground terminal 112 and the first ground terminal 121 is separated by the length of the first radiator 110 and the length of the second radiator 120. As such, a point where the third resonance generated by the fourth radiator 160 is grounded is far from a point where the first resonance is grounded. There is good isolation between the third resonance generated by the fourth radiator 160 and each of the first resonance and the second resonance.

It can be understood that, when there is good isolation between the third resonance generated by the fourth radiator 160 and each of the first resonance and the second resonance, the resonant frequency range of the first resonance, the resonant frequency range of the second resonance, and the resonant frequency range of the third resonance generated by the fourth radiator 160 may be the same. And even if the antenna apparatus 100 transmits three wireless signals of a same frequency band, such isolation may also enable the communication requirement to be met. The first resonance, the second resonance, and the third resonance generated by the fourth radiator 160 may provide MIMO transmission.

Certainly, one or two of the resonant frequency range of the first resonance, the resonant frequency range of the second resonance, and the resonant frequency range of the third resonance generated by the fourth radiator 160 may also be different from the other two or the other one of the three resonant frequency ranges, or the resonant frequency range of the first resonance, the resonant frequency range of the second resonance and the resonant frequency range of the third resonance generated by the fourth radiator 160 may be different from each other, so as to increase the isolation between the resonances.

It can be understood that, the resonant frequency of the third resonance may be different from the resonant frequency of the fourth resonance. For example, the resonant frequency band of the fourth resonance may be the B3 frequency band (1.71 GHz to 1.88 GHz), and the resonant frequency band of the third resonance may be the N41 frequency band (2.5 GHz to 2.69 GHz).

In the antenna apparatus 100 of the present embodiment of the present disclosure, in a case where the antenna apparatus 100 is in the NSA mode, when the third feeding source 180 provides the fourth excitation signal 14, the fifth radiator 170 may generate the fourth resonance under the tuning of the third matching circuit M3, and the fourth radiator 160 may generate the third resonance under the tuning of the second matching circuit M2. That is, when the third feeding source 180 feeds one excitation signal, two resonances may be generated by the fifth radiator 170 and the fourth radiator 160 respectively, which enables miniaturization of the antenna apparatus 100. Moreover, there is good isolation between the third resonance/fourth resonance and each of the first resonance and the second resonance, and the radiation performance of the antenna apparatus 100 can be thus improved.

Figure 6:
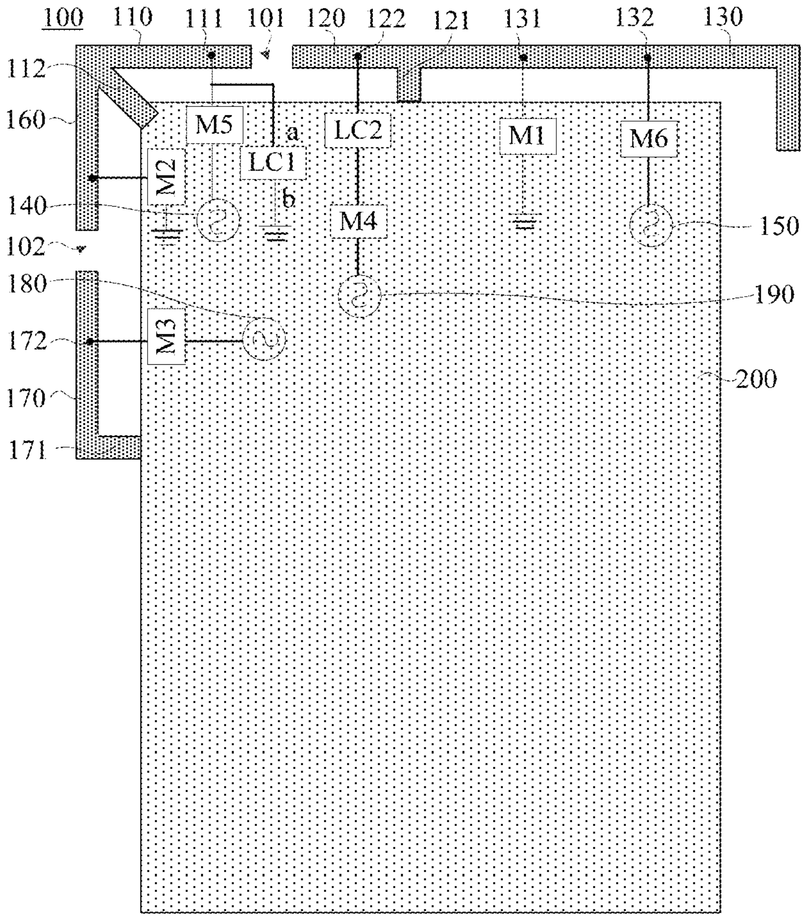
FIG. 6 is a schematic diagram illustrating a third structure of an antenna apparatus according to an embodiment of the present disclosure.
Figure 7:
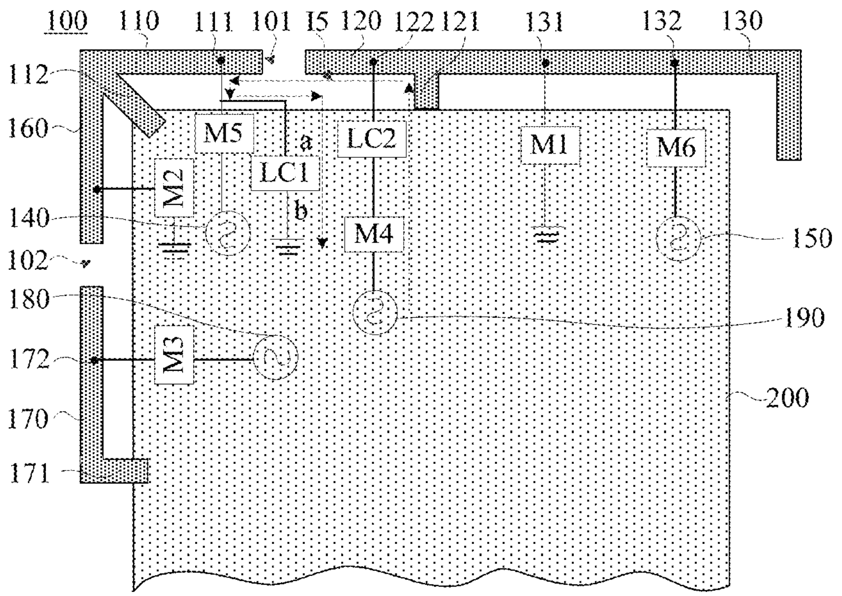
FIG. 7 is a first schematic diagram illustrating a current distribution excited by the antenna apparatus shown in FIG. 6.

Referring to FIG. 6 and FIG. 7, FIG. 6 is a schematic diagram illustrating a third structure of an antenna apparatus according to an embodiment of the present disclosure, and FIG. 7 is a first schematic diagram illustrating a current distribution excited by the antenna apparatus shown in FIG. 6. The antenna apparatus 100 may further include a fourth feeding source 190. The fourth feeding source 190 may be coupled to the second radiator 120, to excite the second radiator 120 and the first radiator 110 to generate a fifth resonance.

As shown in FIG. 6, a fourth feeding terminal 122 may be provided on the second radiator 120. The fourth feeding terminal 122 may be located between the first coupling gap 101 and the first ground terminal 121. The fourth feeding source 190 may be electrically connected to the second radiator 120 through the fourth feeding terminal 122.

As shown in FIG. 7, the fourth feeding source 190 may provide a fifth excitation signal I5. The fifth excitation signal I5 is transmitted on the second radiator 120, and may be coupled to the first radiator 110 through the first coupling gap 101, to excite at least part of the second radiator 120 and at least part of the first radiator 110 to jointly generate the fifth resonance.

It can be understood that the first resonance is generated jointly by the first radiator 110 and the second radiator 120, and the fifth resonance is also generated jointly by the first radiator 110 and the second radiator 120. Thus, the first radiator 110 and the second radiator 120 may be reused, which enables miniaturization of the antenna apparatus 100.

It can be understood that the resonant frequency range of the fifth resonance may be different from the resonant frequency range of the first resonance, and the first radiator 110 and the second radiator 120 may generate at least one of the first resonance and the fifth resonance.

It can be understood that the fifth resonance may also be generated simultaneously with one or more of the second resonance, the third resonance, and the fourth resonance. In these resonances, a point where the fifth resonance is grounded is relatively close to a point where the fourth resonance is grounded. When the antenna apparatus 100 simultaneously generates the fifth resonance and the fourth resonance, since grounding is performed between the fourth radiator 160 and the first radiator 110 through the third ground terminal 112, the third ground terminal 112 may make the isolation between the fifth resonance and the fourth resonance increased, and also ensure the radiation performance of the fifth resonance and the radiation performance of the fourth resonance.

Based on the good isolation between the fifth resonance and the fourth resonance, the resonant frequency range of the fifth resonance may be the same as the resonant frequency range of the fourth resonance, the resonant frequency range of the second resonance, and the resonant frequency range of the third resonance. And even if the antenna apparatus 100 transmits multiple wireless signals of a same frequency band, such isolation may also enable the communication requirement to be met. The multiple resonances may provide MIMO transmission. Certainly, the resonant frequency range of the fifth resonance may also be different from the resonant frequency range(s) of one or more of other resonances, to increase the isolation among the multiple resonances.

In order to further increase the isolation between the fourth resonance and the fifth resonance, referring to FIG. 7 and FIG. 8 again, the antenna apparatus 100 in the embodiments of the present disclosure may further include a first filter circuit LC1. The filter circuit may also be referred to as a filter network.

The first filter circuit LC1 may include a first end a and a second end b. The first end a may be coupled between the first feeding source 140 and the first radiator 110, for example, it may be coupled between the first feeding source 140 and the first feeding terminal 111. The second end b may be grounded. The first filter circuit LC1 may short out the fifth excitation signal I5, for the generation of the fifth resonance.

It can be understood that, with regard to the expression that the first filter circuit LC1 shorts out the fifth excitation signal I5, it may mean that the resistance of the first filter circuit LC1 is infinitely small at the frequency band of the fifth excitation signal I5, so that the fifth excitation signal I5 is grounded. As shown in FIG. 7, when the fourth feeding source 190 feeds the fifth excitation signal I5 to the second radiator 120, the fifth excitation signal I5 may, after being coupled to the first radiator 110 through the first coupling gap 101, be grounded through the first filter circuit LC1.

It can be understood that the first filter circuit LC1 may include a circuit composed of any series connection or any parallel connection of a capacitor, an inductor, and a resistor. Details thereof are not described herein.

The antenna apparatus of the embodiment of the present disclosure is provided with the first filter circuit LC1. On one hand, the first filter circuit LC1 can prevent the fifth excitation signal I5 from being grounded through the third ground terminal 112, so as to avoid coincidence with the point where the current of the fourth excitation signal 14 is grounded. Thus, good isolation can also be provided between the fourth resonance and fifth resonance adjacent to each other, and the fourth resonance and the fifth resonance can provide good radiation performance. On the other hand, the first end a of the first filter circuit LC1 is coupled between the first feeding source 140 and the first radiator 110, and the first filter circuit LC1 can also prevent flowing of the fifth excitation signal I5 into the first feeding source 140 which would otherwise affect the performance of the first feeding source 140, so as to ensure the normal formation of the first resonance.

Figure 8:
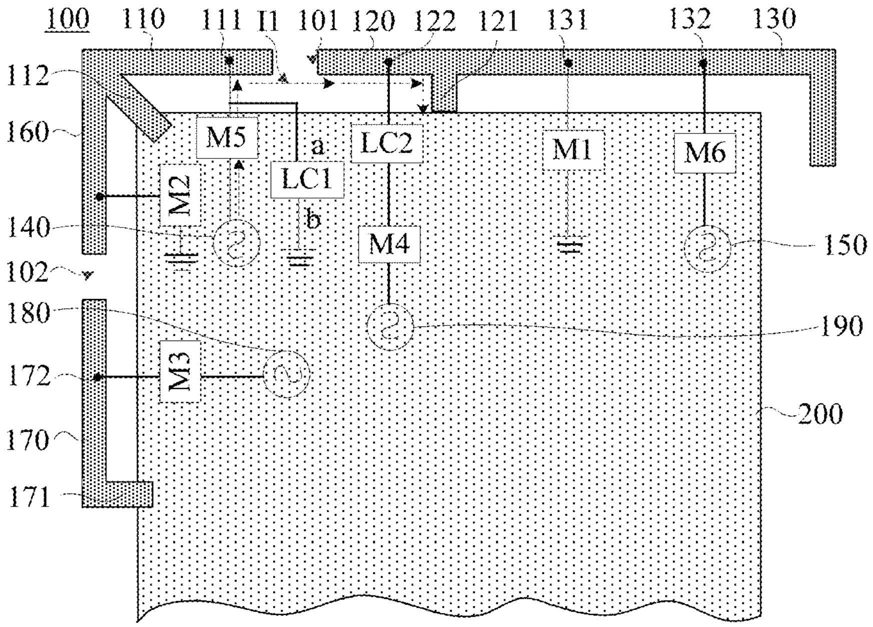
FIG. 8 is a second schematic diagram illustrating the current distribution excited by the antenna apparatus shown in FIG. 6.

For the case where the antenna apparatus 100 is provided with the fourth feeding source 190, referring to the FIG. 6 and FIG. 8, FIG. 8 is a second schematic diagram illustrating the current distribution excited by the antenna apparatus shown in FIG. 6. The antenna apparatus 100 may further include a second filter circuit LC2. The second filter circuit may be a filter circuit.

One end of the second filter circuit LC2 may be electrically connected to the fourth feeding terminal 122 of the second radiator 120, and the other end of the second filter circuit LC2 may be electrically connected to the fourth feeding source 190. The second filter circuit LC2 is coupled between the fourth feeding source 190 and the second radiator 120. The second filter circuit LC2 may be an open circuit to the first excitation signal I1 fed by the first feeding source 140, for the generation of the first resonance mentioned above.

It can be understood that, with regard to the expression that the second filter circuit LC2 is an open circuit to the first excitation signal I1, it may mean that the resistance of the second filter circuit LC2 is infinite under the resonance of the first excitation signal I1, to block the first excitation signal I1 from flowing into the fourth feeding source 190.

It can be understood that the second filter circuit LC2 may include a circuit composed of any series connection or any parallel connection of a capacitor, an inductor, and a resistor. Details thereof are not described herein.

The antenna apparatus of the embodiment of the present disclosure is provided with the second filter circuit LC2. The second filter circuit LC2 is an open circuit to the first excitation signal I1. On one hand, the second filter circuit LC2 can prevent flowing of the first excitation signal I1 into the fourth feeding source 190 which would otherwise affect the performance of the fourth feeding source 190, so as to ensure the normal operation of the fifth resonance. On the other hand, in the case where the second filter circuit LC2 blocks the first excitation signal I1, the first excitation signal I1 may, after being coupled to the second radiator 120 through the second coupling gap 102, be grounded through the farthest first ground terminal 121, thereby ensuring the isolation between the first resonance and the fourth resonance.

To further improve the performance of the antenna apparatus 100, referring to FIG. 6 again, the antenna apparatus 100 may further include a fourth matching circuit M4, a fifth matching circuit M5, and a sixth matching circuit M6.

The fourth matching circuit M5 may be coupled between the fourth feeding source 190 and the second radiator 120. For example, the fourth matching circuit M4 is connected in series between the fourth feeding source 190 and the fourth feeding terminal 122. The fourth matching circuit M4 may perform impedance matching on the fifth excitation signal I5 provided by the fourth feeding source 190, so that the second radiator 120 and the first radiator 110 may generate the fifth resonance.

The fifth matching circuit M5 may be coupled between the first feeding source 140 and the first radiator 110. For example, the fifth matching circuit M5 is connected in series between the first feeding source 140 and the first feeding terminal 111. The fifth matching circuit M5 may perform impedance matching on the first excitation signal I1 provided by the first feeding source 140, so that the first radiator 110 and the second radiator 120 may generate the first resonance.

The sixth matching circuit M6 may be coupled between the second feeding source 150 and the third radiator 130. For example, the sixth matching circuit M6 is connected in series between the second feeding source 150 and the second feeding terminal 132. The sixth matching circuit M6 may perform impedance matching on the second excitation signal 12 provided by the second feeding source 150, so that the third radiator 130 may generate the second resonance.

It can be understood that, the fourth matching circuit M4, the fifth matching circuit M5, and the sixth matching circuit M6 each may include a circuit composed of any series connection or any parallel connection of a capacitor, an inductor, and a resistor, which will not be described in detail herein.

It can be understood that, at least one, two or more of the first matching circuit M1, the second matching circuit M2, the third matching circuit M3, the fourth matching circuit M4, the fifth matching circuit M5, and the sixth matching circuit M6 may have a different structure. The structures of the matching circuits mentioned above are not limited in the embodiments of the present disclosure. The antenna apparatus 100 in the embodiments of the present disclosure may better generate the first resonance, the second resonance, the third resonance, the fourth resonance, and the fifth resonance under the action of the matching circuits mentioned above.

Based on this, the antenna apparatus 100 of the embodiment of the present disclosure may generate the first resonance to the fifth resonance, so that the antenna apparatus 100 can be applied in 5G communication. For example, it may be applied in a 5G NSA mode, or a 5G SA mode. In the SA mode, the antenna apparatus 100 only needs to operate in a New Radio Access Technology in 3GPP (New Radio Access Technology in 3GPP, NR for short) state. In the NSA mode, the antenna apparatus 100 needs to operate in a Long Term Evolution (Long Term Evolution, LTE) state and the NR state simultaneously; and in this case, the fourth radiator 160 and the fifth radiator 170 may simultaneously generate the third resonance and the fourth resonance, so that the antenna apparatus 100 may operate at a B3 frequency band (1.71 GHz to 1.88 GHz) and a N41 frequency band (2.5 GHz to 2.69 GHz) simultaneously. The decoupling principle of the antenna apparatus 100 is set forth below by utilizing the antenna apparatus 100 operating in the SA mode and the NSA mode, respectively.

When the antenna apparatus 100 is in the SA mode, the antenna apparatus 100 only needs to operate in the NR state. As shown in FIG. 4, the first feeding source 140 may feed the first excitation signal I1 to the first feeding terminal 111. The first radiator 110 and the second radiator 120 are coupled through the first coupling gap 101 under the action of the first excitation signal I1, to generate a first resonance. The first resonance may be in the N41 frequency band. When the second feeding source 150 feeds the second excitation signal 12 to the second feeding terminal 132, the third radiator 130 may generate a second resonance under the action of the second excitation signal 12. The second resonance may also be in the N41 frequency band. When the third feeding source 180 feeds the third excitation signal I3 to the fifth radiator 170, the third matching circuit M3 may perform impedance matching on the third excitation signal I3, so that the third excitation signal I3 may be grounded through the fourth ground terminal 171 (for example, the resonant frequency band of the third matching circuit M3 is tuned to the N41 frequency band, the resonant frequency band of the second matching circuit M2 is always fixed in the N41 frequency band; and when the third excitation signal I3 is in the N41 frequency band, the third excitation signal I3 may be grounded through the nearest fourth ground terminal 171) to generate the third resonance. The third resonance may also be in the N41 frequency band. In this way, the antenna apparatus 100 may provide three resonances of N41 frequency band (the first resonance, the second resonance, and the third resonance).

In this case, the first radiator 110 and the second radiator 120 may generate the first resonance; the third radiator 130 may generate the second resonance; and the fifth radiator 170 may generate the third resonance. The first resonance, the second resonance, and the third resonance may be in the same N41 frequency band. The first resonance and the second resonance are separated by at least the length of the third radiator 130, and the first resonance and the third resonance are separated by at least the length of the fourth radiator 160; thus, isolation in a great level is provided among the multiple resonances.

Figure 9:
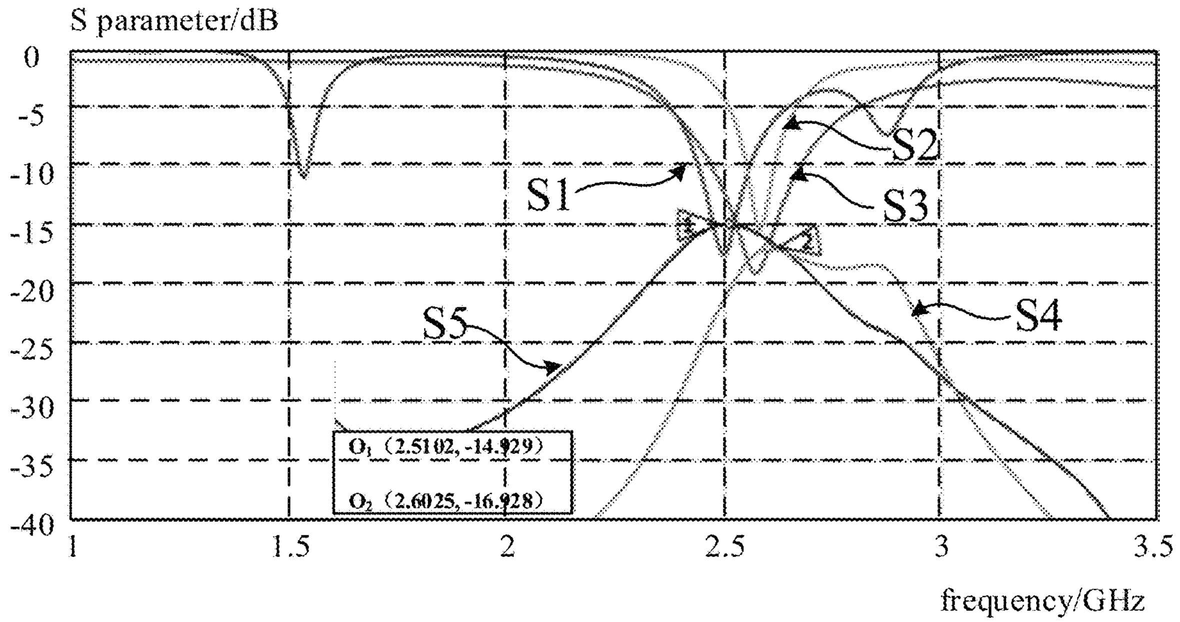
FIG. 9 is a schematic diagram illustrating reflection coefficient curves of the antenna apparatus according to the embodiment of the present disclosure at a N41 frequency band in an SA mode.
Figure 10:
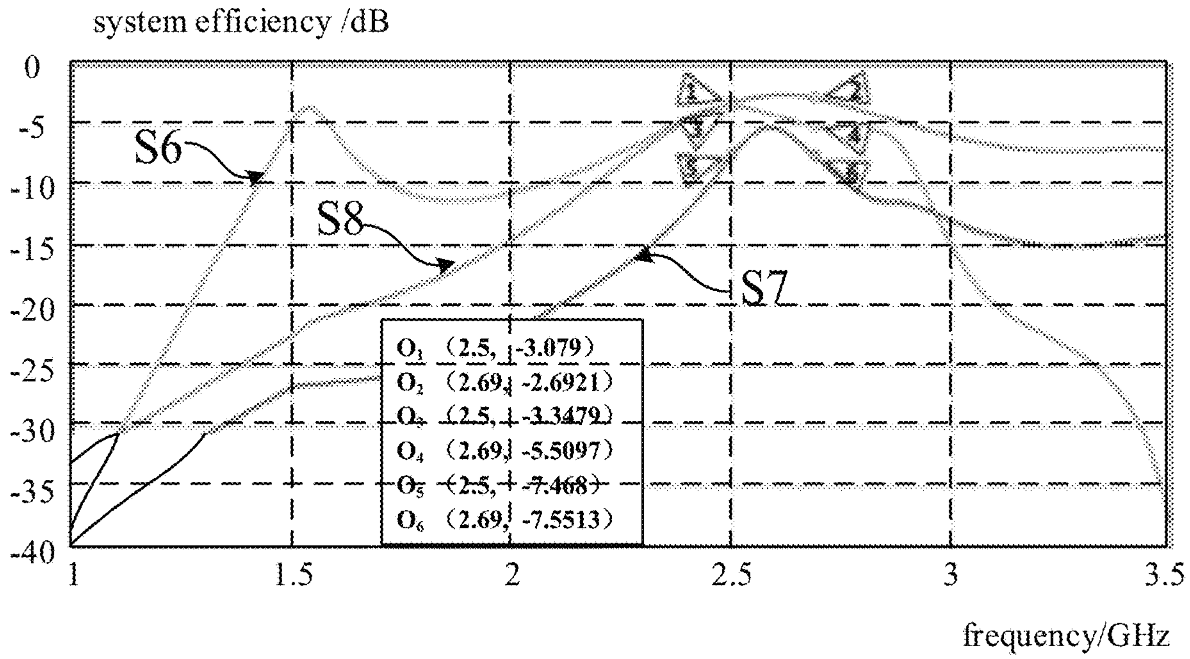
FIG. 10 is a schematic diagram illustrating system efficiency curves of the antenna apparatus according to the embodiment of the present disclosure at the N41 frequency band in the SA mode.

Referring to FIG. 9 and FIG. 10, FIG. 9 is a schematic diagram illustrating reflection coefficient curves of the antenna apparatus according to the embodiments of the disclosure at the N41 frequency band in the SA mode, and FIG. 10 is a schematic diagram illustrating system efficiency curves of the antenna apparatus according to the embodiments of the present disclosure at the N41 frequency band in the SA mode. As shown in FIG. 9, curve S1 represents the reflection coefficient curve of the first resonance at the N41 frequency band; curve S2 represents the reflection coefficient curve of the second resonance at the N41 frequency band, curve S3 represents the reflection coefficient curve of the third resonance at the N41 frequency band, curve S4 represents a curve of isolation between the first resonance and the second resonance at the N41 frequency band, and curve S5 represents a curve of isolation between the first resonance and the third resonance at the N41 frequency band. As can be seen from the foregoing embodiments, the first resonance may be grounded through the first ground terminal 121; the second resonance may be formed at a place away from the first ground terminal 121, and the second ground terminal 131 may prevent flowing of the second excitation signal 12 into the second radiator 120 which would otherwise affect the first resonance; the third resonance is grounded through the fourth ground terminal 171. Therefore, there is a long distance between the first resonance and the second resonance, and there is also a long distance between the first resonance and the third resonance. As shown in FIG. 9, the isolation between the first resonance and the second resonance is better than −16.9 dB, and the isolation between the first resonance and the third resonance is better than −14.9 dB. Thus, there is good isolation among the three resonances in the embodiments of the present disclosure.

As shown in FIG. 10, curve S6 represents the system efficiency curve of the first resonance at the N41 frequency band, curve S7 represents the system efficiency curve of the second resonance at the N41 frequency band, and curve S8 represents the system efficiency curve of the third resonance at the N41 frequency band. It can be seen from FIG. 10 that the system efficiency of the first resonance at the N41 frequency band is about −5.1 dB to −3.3 dB, the system efficiency of the second resonance at the N41 frequency band is about −7.4 dB to −5 dB, the system efficiency of the third resonance at the N41 frequency band is about −3.1 dB to −2.5 dB. There are good radiation characteristics of the first resonance, the second resonance and the third resonance.

In the antenna apparatus 100 of the embodiments of the present disclosure, when the adjacent radiators operate at the same frequency band, good isolation can be provided between different resonances generated by using different radiators, thereby ensuring that the first resonance, the second resonance, and the third resonance can operate normally and simultaneously in the SA mode. In addition, the first matching circuit M1 serves as an equivalent short circuit at the N41 frequency band, for the current to is grounded; this can also avoid the influence of the second resonance on the first resonance, so as to further increase the isolation between the antennas.

When the antenna apparatus 100 is in the NSA mode, the antenna apparatus 100 needs to operate in the LTE state and NR state simultaneously. It is illustrated by taking, as an example, a case where the antenna apparatus 100 is in a combination state of the B3 frequency band and the N41 frequency band. As shown in FIG. 5, the first feeding source 140 may feed the first excitation signal I1 to the first feeding terminal 111, and the first radiator 110 and the second radiator 120 are coupled through the first coupling gap 101 under the action of the first excitation signal I1, to generate a first resonance. The first resonance may be in the N41 frequency band. When the second feeding source 150 feeds the second excitation signal 12 to the second feeding terminal 132, the third radiator 130 may generate a second resonance under the action of the second excitation signal 12. The second resonance may also be in the N41 frequency band. When the third feeding source 180 feeds the fourth excitation signal 14 to the fifth radiator 170, the third matching circuit M3 may perform impedance matching on the fourth excitation signal 14, so that the fifth radiator 170 may generate a fourth resonance. The fourth resonance may be in the B3 frequency band. The fourth excitation signal 14 may be coupled to the fourth radiator 160 through the second coupling gap 102, and grounded from the second matching circuit M2 of the fourth radiator 160. The second matching circuit M2 may perform impedance matching on the fourth excitation signal 14, to excite the fourth radiator 160 to generate a third resonance. The third resonance may be in the N41 frequency band. In this way, the antenna apparatus 100 may provide a resonance of B3 frequency band (the fourth resonance) and three resonances of N41 frequency band (the first resonance, the second resonance, and the third resonance).

The first radiator 110 and the second radiator 120 may generate the first resonance; the third radiator 130 may generate the second resonance; the fifth radiator 170 may generate the fourth resonance; and the fourth radiator 160 may generate the third resonance. The first resonance, the second resonance, and the third resonance may be in the same N41 frequency band, and the fourth resonance may be in the B3 frequency band. Since the isolation between the first resonance and the second resonance may be increased through the second ground terminal 131, a point where the current of the first resonance is grounded is different from a point where the current of the third resonance is grounded; thus, isolation in a great level is provided between the multiple resonances.

Figure 11:
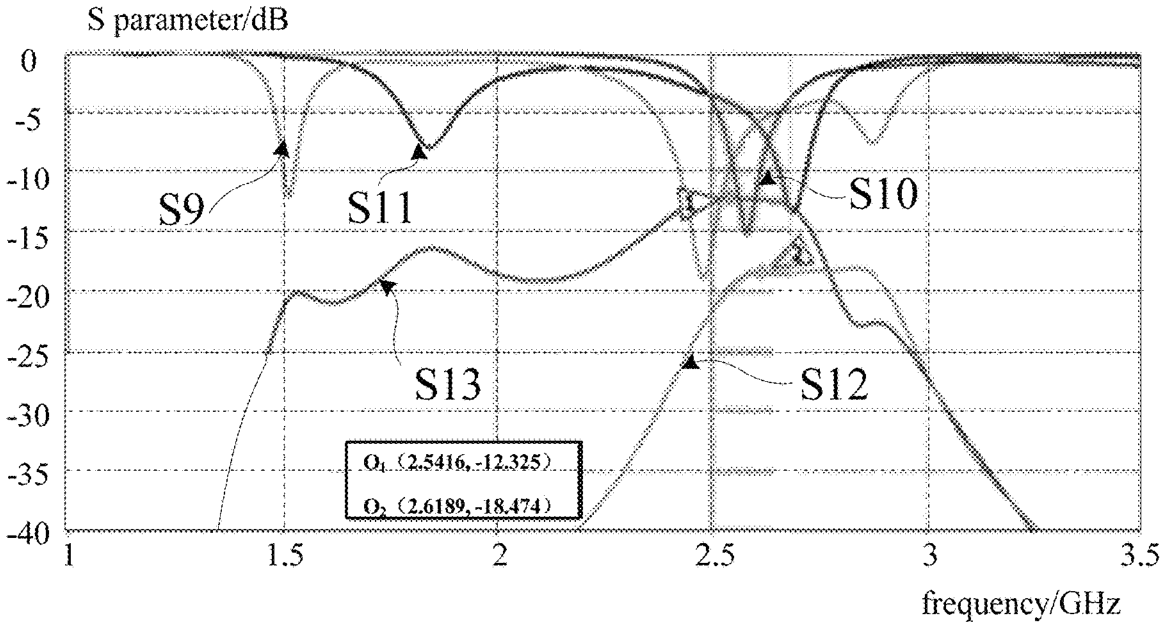
FIG. 11 is a schematic diagram illustrating reflection coefficient curves of the antenna apparatus according to the embodiment of the present disclosure at the N41 frequency band in a NSA mode.
Figure 12:
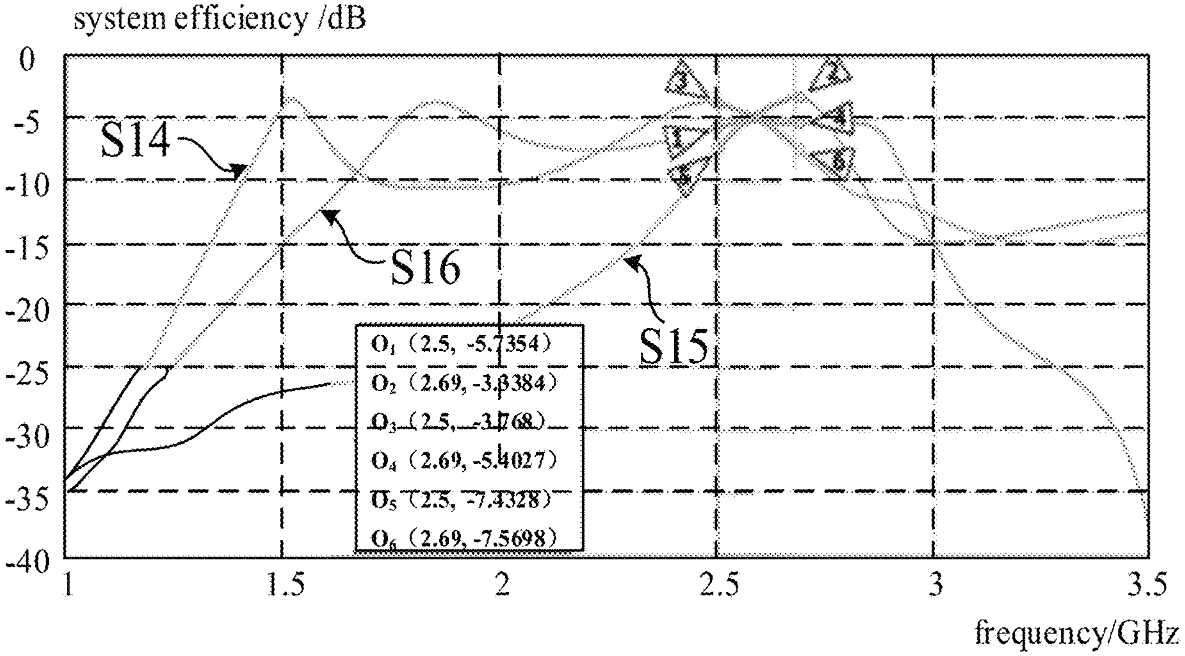
FIG. 12 is a schematic diagram illustrating system efficiency curves of the antenna apparatus according to the embodiment of the present disclosure at the N41 frequency band in the NSA mode.

Referring to FIG. 11 and FIG. 12, FIG. 11 is a schematic diagram illustrating reflection coefficient curves of the antenna apparatus according to the embodiments of the present disclosure at the N41 frequency band in the NSA mode, and FIG. 12 is a schematic diagram illustrating system efficiency curves of the antenna apparatus according to the embodiments of the present disclosure at the N41 frequency band in the NSA mode. As shown in FIG. 11, curve S9 represents the reflection coefficient curve of the first resonance at the N41 frequency band, curve S10 represents the reflection coefficient curve of the second resonance at the N41 frequency band, curve S11 represents the reflection coefficient curve of the third resonance at the N41 frequency band, curve S12 represents a curve of isolation between the first resonance and the second resonance at the N41 frequency band, and curve S13 represents a curve of isolation between the first resonance and the third resonance at the N41 frequency band. Since the isolation between the first resonance and the second resonance is increased through the second ground terminal 131, the first resonance is grounded through the first ground terminal 121, and the third resonance is grounded through the third ground terminal 112, there is a long distance between the first resonance and the third resonance. It can be seen from FIG. 11 that the isolation between the first resonance and the second resonance is better than −18.5 dB, and the isolation between the first resonance and the third resonance is better than −12.3 dB. Thus, there is good isolation among the three resonances in the embodiments of the present disclosure.

As shown in FIG. 12, curve S14 represents the system efficiency curve of the first resonance at the N41 frequency band, curve S15 represents the system efficiency curve of the second resonance at the N41 frequency band, and curve S16 represents the system efficiency curve of the third resonance at the N41 frequency band. It can be seen from FIG. 12 that, the system efficiency of the first resonance at the N41 frequency band is about −5.4 dB to −3.8 dB, the system efficiency of the second resonance at the N41 frequency band is about −7.4 dB to −5 dB, and the system efficiency of the third resonance at the N41 frequency band is about −5.7 dB to −3.3 dB. There are good radiation characteristics of the first resonance, the second resonance and the third resonance.

In the antenna apparatus 100 of the embodiments of the present disclosure, when adjacent radiators operate at the same frequency band, good isolation can be provided between different resonances generated by different radiators, and it is possible to ensure that the first resonance, the second resonance, and the third resonance can operate normally and simultaneously in the NSA mode.

It can be understood that the first resonance to the fifth resonance of the present disclosure may operate at many frequency bands at the same time. For example, such frequency bands may include, but are not limited to, a low-frequency band (B28/B20/B5/B8), a medium-high frequency band (B3/B1/B40/B41), a 2.4G/5G Wi-Fi band, and a 5G band (N41/N78/N79), and this is not limited in the embodiment of the present disclosure.

Figure 13:
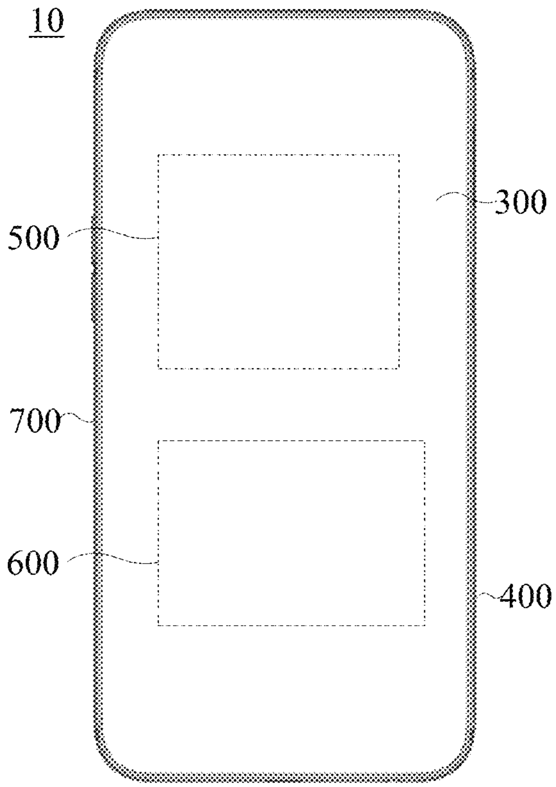
FIG. 13 is a structural schematic diagram of an electronic device according to an embodiment of the present disclosure.

Based on the structure of the antenna apparatus 100 mentioned above, an electronic device is also provided according to an embodiment of the present disclosure. The electronic device may be a smartphone, a tablet computer, etc., or it may also be a game device, an Augmented Reality (Augmented Reality, AR) device, an in-vehicle device, a data storage device, an audio playback device, a video playback device, a notebook computer, or a desktop computing device, etc. Referring to FIG. 13, FIG. 13 is a structural schematic diagram of an electronic device according to an embodiment of the present disclosure. In addition to the antenna apparatus 100 and the ground plane 200, the electronic device 10 may further include a display screen 300, a middle frame 400, a circuit board 500, a battery 600, and a rear case 700.

The display screen 300 is provided on the middle frame 400, to provide a display surface of the electronic device 10 for displaying information such as an image and text. The display screen 300 may include a liquid crystal display (Liquid Crystal Display, LCD) or an organic light-emitting diode (Organic Light-Emitting Diode, OLED) display or the like.

It can be understood that the display screen 300 may be a full screen. In this case, the entire area of the display screen 300 serves as the display area, and no non-display area is included, or the non-display area occupies only a small part of the display screen 300 for the user, so that the display screen 300 has a large screen ratio. Alternatively, the display screen 300 may not be a full screen, and the display screen 300 includes a display area and a non-display area adjacent to the display area. The display area is configured to display information, and the non-display area does not display information.

It can be understood that a cover plate may also be provided on the display screen 300 to protect the display screen 300, and prevent the display screen 300 from being scratched or damaged by water. The cover plate may be a transparent glass cover plate, so that the user can observe the contents displayed on the display screen 300 through the cover plate. For example, the cover plate may be a glass cover plate made of sapphire.

The middle frame 400 may be in a thin-plate-like structure or a thin-flake-like structure, or may be in a hollow frame structure. The middle frame provides support for the electronic components or functional components in the electronic device 10, so as to mount the electronic components and functional components of the electronic device 10 together. For example, a structure, such as a groove, a protrusion, and a through hole, may be defined on the middle frame 400, to facilitate the installation of the electronic components or the functional components of the electronic device 10. It can be understood that the middle frame may be made from a metal, plastic or the like.

It can be understood that when the middle frame 400 is made of a metal, the first radiator 110, the second radiator 120, the third radiator 130, the fourth radiator 160, and the fifth radiator 170 may be multiple metal branches on the middle frame 400. For example, the first coupling gap 101 and the second coupling gap 102 may be provided on the middle frame 400, to form the first radiator to the fifth radiator. In this case, the middle frame 400 may be reused as a radiator, thereby saving the space occupied by the radiator.

The circuit board 500 is fixedly provided on the middle frame 400, and the circuit board 500 is sealed inside the electronic device 10 through the rear case 700. The circuit board 500 may be a main board of the electronic device 10. A processor may be integrated on the circuit board 500; in addition, one or more of functional components such as an earphone interface, an acceleration sensor, a gyroscope, and a motor may also be integrated on the circuit board 500. The display screen 300 may be electrically connected to the circuit board 500, so that the display of the display screen 300 may be controlled by the processor on the circuit board 500.

It can be understood that, one or more of the first feeding source 140, the second feeding source 150, the third feeding source 180, the fourth feeding source 190, the first filter circuit LC1, the second filter circuit LC2, the first matching circuit M1, the second matching circuit M2, the third matching circuit M3, the fourth matching circuit M4, the fifth matching circuit M5, and the sixth matching circuit M6 of the antenna apparatus 100 may be provided on the circuit board 500. Certainly, the above components may also be provided on a small board of the electronic device 10, which is not limited herein.

It can be understood that, one or more of the first radiator 110, the second radiator 120, the third radiator 130, the fourth radiator 160, and the fifth radiator 170 may also be provided on the circuit board 500, for example, one or more of them is formed on one surface of the circuit board 500 by etching, spraying or the like. Certainly, the radiators may also be provided on a bracket of the electronic device 10 in such a manner that the radiators are located inside the electronic device 10.

The battery 600 is provided on the middle frame 400, and the battery 600 is sealed inside the electronic device 10 by the rear case 700. The battery 600 is electrically connected to the circuit board 500, for supplying power to the electronic device 10. A power management circuit may be provided on the circuit board 500. The power management circuit is configured to distribute the voltage provided by the battery 600 to various electronic components in the electronic device 10.

The rear case 700 is connected to the middle frame 400. For example, the rear case 700 may be attached to the middle frame 400 by an adhesive such as a double-sided tape, so as to be connected with the middle frame 400. The rear case 700 is used to seal, together with the middle frame 400 and the display screen 300, the electronic components and the functional components of the electronic device 10 inside the electronic device 10, so as to protect the electronic components and the functional components of the electronic device 10.

It should be understood that, in the description of the disclosure, terms such as "first", "second" and the like are only used to distinguish similar objects, but cannot be understood as indicating or implying relative importance or implicitly indicating the number of technical features indicated.

The antenna apparatus and the electronic device provided in the embodiments of the present disclosure are introduced in detail in the foregoing. Specific examples are presented herein to set forth the principle and implementations of the present disclosure. The foregoing illustration of the embodiments is only to help in understanding the method and core idea of the present disclosure. Meanwhile, those skilled in the art may make modifications in terms of the specific implementations and application scopes, based on to the idea of the present disclosure. Therefore, the specification shall not be construed as limitations to the present disclosure.

What is claimed is:

1. An antenna apparatus, comprising:
- a first radiator;
- a second radiator, wherein a first coupling gap is provided between one end of the second radiator and the first radiator, and a first ground terminal is provided at the other end of the second radiator;
- a first feeding source coupled to the first radiator, wherein the first feeding source is configured to provide a first excitation signal, wherein the first excitation signal is coupled to the second radiator through the first coupling gap, and is grounded through the first ground terminal, to excite the second radiator and at least part of the first radiator to jointly generate a first resonance;
- a third radiator, wherein one end of the third radiator is connected to the first ground terminal, and the other end of the third radiator extends in a direction away from the second radiator, wherein the third radiator is provided with a second ground terminal spaced apart from the first ground terminal; and
- a second feeding source, wherein the second feeding source is coupled to the third radiator on a side of the second ground terminal away from the first ground terminal, and the second feeding source is configured to provide a second excitation signal to excite a part of the third radiator located on the side of the second ground terminal away from the first ground terminal, to generate a second resonance.

2. The antenna apparatus of claim 1, further comprising:

a first matching circuit, wherein one end of the first matching circuit is coupled to the third radiator through the second ground terminal, and the other end of the first matching circuit is grounded; and wherein the first matching circuit is configured to short out a part of the second excitation signal.

3. The antenna apparatus of claim 1, wherein a third ground terminal is provided at an end of the first radiator away from the second radiator, and the antenna apparatus further comprises:

a fourth radiator, wherein one end of the fourth radiator is connected to the third ground terminal, and the other end of the fourth radiator extends in a direction away from the third ground terminal;

a second matching circuit, wherein one end of the second matching circuit is coupled to the fourth radiator, and the other end of the second matching circuit is grounded;

a fifth radiator, wherein a second coupling gap is provided between one end of the fifth radiator and the fourth radiator, and the other end of the fifth radiator extends in a direction away from the fourth radiator;

a third feeding source coupled to the fifth radiator; and a third matching circuit coupled between the third feeding source and the fifth radiator, wherein the third matching circuit is configured to perform impedance matching on an excitation signal provided by the third feeding source.

4. The antenna apparatus of claim 3, wherein the antenna apparatus is adapted to operate in a standalone mode, and in the standalone mode, the third feeding source is configured to provide a third excitation signal, and the fifth radiator is configured to generate a third resonance under tuning of the third matching circuit.

5. The antenna apparatus of claim 4, wherein the antenna apparatus is further adapted to operate in a non-standalone mode, and in the non-standalone mode, the third feeding source is configured to provide a fourth excitation signal, and the fifth radiator is configured to generate a fourth resonance under tuning of the third matching circuit;

wherein the fourth radiator is configured to generate a resonance have a same frequency range as the third resonance under tuning of the second matching circuit.

6. The antenna apparatus of claim 4, wherein the first resonance, the second resonance, and the third resonance have a same frequency range.

7. The antenna apparatus of claim 1, further comprising:

a fourth feeding source coupled to the second radiator, wherein the fourth feeding source is configured to provide a fifth excitation signal, and the fifth excitation signal is coupled to the first radiator through the first coupling gap, to excite at least part of the second radiator and at least part of the first radiator to jointly generate a fifth resonance.

8. The antenna apparatus of claim 7, further comprising:

a first filter circuit having a first end and a second end, wherein the first end is coupled between the first feeding source and the first radiator, and the second end is grounded; and the first filter circuit is configured to short out the fifth excitation signal, for generation of the fifth resonance.

9. The antenna apparatus of claim 7, further comprising:

a second filter circuit coupled between the fourth feeding source and the second radiator, wherein the second filter circuit is configured to provide an open circuit to the first excitation signal, for the generation of the first resonance.

10. The antenna apparatus of claim 7, further comprising:

a fourth matching circuit coupled between the fourth feeding source and the second radiator, wherein the fourth matching circuit is configured to performing impedance matching on the fifth excitation signal.

11. The antenna apparatus of claim 1, further comprising:

a fifth matching circuit coupled between the first feeding source and the first radiator, wherein the fifth matching circuit is configured to perform impedance matching on the first excitation signal.

12. The antenna apparatus of claim 1, further comprising:

a sixth matching circuit coupled between the second feeding source and the third radiator, wherein the sixth matching circuit is configured to perform impedance matching on the second excitation signal.

13. An antenna apparatus, comprising:

a first radiator, configured to receive a first excitation signal;

a second radiator, wherein a first coupling gap is provided between the second radiator and the first radiator, and a first ground terminal is provided at an end of the second radiator away from the first coupling gap, wherein the first excitation signal is coupled to the second radiator through the first coupling gap, and is grounded through the first ground terminal, to excite at least part of the first radiator and the second radiator to jointly generate a first resonance; and a third radiator, wherein the third radiator is connected to the second radiator at the first ground terminal, and the third radiator is provided with a second ground terminal spaced apart from the first ground terminal;

wherein the third radiator is configured to receive a second excitation signal on a side of the second ground terminal away from the first ground terminal, to excite a part of the third radiator to generate a second resonance.

14. An electronic device, comprising an antenna apparatus comprising:

a first radiator;

a second radiator, wherein a first coupling gap is provided between one end of the second radiator and the first radiator, and a first ground terminal is provided at the other end of the second radiator;

a first feeding source coupled to the first radiator, wherein the first feeding source is configured to provide a first excitation signal, wherein the first excitation signal is coupled to the second radiator through the first coupling gap, and is grounded through the first ground terminal, to excite at least part of the first radiator and the second radiator to jointly generate a first resonance;

a third radiator, wherein one end of the third radiator is connected to the first ground terminal, and the other end of the third radiator extends in a direction away from the second radiator, and wherein the third radiator is provided with a second ground terminal spaced apart from the first ground terminal; and a second feeding source, wherein the second feeding source is coupled to the third radiator on a side of the second ground terminal away from the first ground terminal, and the second feeding source is configured to provide a second excitation signal to excite a part of the third radiator located on the side of the second ground terminal away from the first ground terminal, to generate a second resonance.

15. The electronic device of claim 14, wherein the antenna apparatus further comprises:

a first matching circuit, wherein one end of the first matching circuit is coupled to the third radiator through the second ground terminal, and the other end of the first matching circuit is grounded; and wherein the first matching circuit is configured to short out a part of the second excitation signal.

16. The electronic device of claim 14, wherein a third ground terminal is provided at an end of the first radiator away from the second radiator, and the antenna apparatus further comprises:

a fourth radiator, wherein one end of the fourth radiator is connected to the third ground terminal, and the other end of the fourth radiator extends in a direction away from the third ground terminal;

a second matching circuit, wherein one end of the second matching circuit is coupled to the fourth radiator, and the other end of the second matching circuit is grounded;

a fifth radiator, wherein a second coupling gap is formed between one end of the fifth radiator and the fourth radiator, and the other end of the fifth radiator extends in a direction away from the fourth radiator;

a third feeding source coupled to the fifth radiator; and a third matching circuit coupled between the third feeding source and the fifth radiator, wherein the third matching circuit is configured to perform impedance matching on an excitation signal provided by the third feeding source.

17. The electronic device of claim 16, wherein the antenna apparatus is adapted to operate in a standalone mode, and in standalone mode, the third feeding source is configured to provide a third excitation signal, and the fifth radiator is configured to generate a third resonance under tuning of the third matching circuit.

18. The electronic device of claim 17, wherein the antenna apparatus is further adapted to operate in a non-standalone mode, and in the non-standalone mode, the third feeding source is configured to provide a fourth excitation signal, and the fifth radiator is configured to generate a fourth resonance under tuning of the third matching circuit;

wherein the fourth radiator is configured to generate a resonance have a same frequency range as the third resonance under tuning of the second matching circuit.

19. The electronic device of claim 14, wherein the antenna apparatus further comprises:

a fourth feeding source coupled to the second radiator, wherein the fourth feeding source is configured to provide a fifth excitation signal, and the fifth excitation signal is coupled to the first radiator through the first coupling gap, to excite at least part of the second radiator and at least part of the first radiator to jointly generate a fifth resonance; and a first filter circuit having a first end and a second end, wherein the first end is coupled between the first feeding source and the first radiator, and the second end is grounded;

wherein the first filter circuit is configured to short out the fifth excitation signal, for generation of the fifth resonance.

20. The electronic device of claim 19, wherein the antenna apparatus further comprises:

a second filter circuit coupled between the fourth feeding source and the second radiator, wherein the second filter circuit is configured to provide an open circuit to the first excitation signal, for generation of the first resonance.

* * * * *